United States Patent
Bingham et al.

(10) Patent No.: US 10,970,444 B1
(45) Date of Patent: Apr. 6, 2021

(54) METHODS AND SYSTEMS TO VERIFY CORRECTNESS OF BUG FIXES IN INTEGRATED CIRCUITS

(71) Applicant: International Business Machines Corporation, Armonk, NY (US)

(72) Inventors: Bradley Donald Bingham, Austin, TX (US); Viresh Paruthi, Austin, TX (US); Abrar Polani, Plantation, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/989,347

(22) Filed: Aug. 10, 2020

(51) Int. Cl.
*G06F 17/50* (2006.01)
*G01R 31/00* (2006.01)
*G06F 30/33* (2020.01)
*G01R 31/317* (2006.01)
*G06F 30/3323* (2020.01)
*G06F 30/337* (2020.01)
*G06F 119/16* (2020.01)

(52) U.S. Cl.
CPC ....... *G06F 30/33* (2020.01); *G01R 31/31705* (2013.01); *G06F 30/3323* (2020.01); *G06F 30/337* (2020.01); *G06F 2119/16* (2020.01)

(58) Field of Classification Search
None
See application file for complete search history.

(56) References Cited

U.S. PATENT DOCUMENTS

| | | | |
|---|---|---|---|
| 5,508,937 | A | 4/1996 | Abato et al. |
| 5,761,079 | A | 6/1998 | Drumm |
| 6,321,363 | B1 | 11/2001 | Huang et al. |
| 6,975,976 | B1 | 12/2005 | Casavant et al. |
| 6,993,734 | B2 | 1/2006 | Baumgartner et al. |
| 7,093,218 | B2 | 8/2006 | Baumgartner et al. |
| 7,165,231 | B2 | 1/2007 | Buckley, Jr. |
| 7,882,473 | B2 * | 2/2011 | Baumgartner ...... G06F 30/3323 716/106 |
| 8,042,078 | B2 | 10/2011 | Paruthi et al. |
| 9,495,504 | B2 * | 11/2016 | Auerbach ............... G06F 30/30 |
| 2005/0188337 | A1 | 8/2005 | Baumgartner et al. |
| 2020/0200820 | A1 * | 6/2020 | Strasser ......... G01R 31/318307 |

* cited by examiner

*Primary Examiner* — Leigh M Garbowski
(74) *Attorney, Agent, or Firm* — Scully, Scott, Murphy & Presser, P.C.

(57) ABSTRACT

A method and/or system is disclosed for pre-silicon verification of a first integrated circuit design modified to a second integrated circuit design to avoid a hit of property P where property P has a known counterexample. The method/system includes applying a first implication check in an equivalence testbench on the first integrated circuit and on the second integrated circuit to determine whether the second integrated circuit hits property P in the same way as the first integrated circuit hits property P. Additionally or alternatively applying a second implication check to determine whether the second integrated circuit hits property P at a different timestep than the first integrated circuit hits property P. Additionally or alternatively applying a third implication check to determine whether the second integrated circuit hits property P further along a path than the first integrated circuit hits property P.

20 Claims, 5 Drawing Sheets ns to test and verify integrated circuit designs.

METHODS AND SYSTEMS TO VERIFY CORRECTNESS OF BUG FIXES IN INTEGRATED CIRCUITS

BACKGROUND

The disclosure herein relates generally to the field of integrated circuit design and testing, and more particularly, to methods, apparatuses, and/or systems to test and verify integrated circuit designs.

As the complexity of microprocessors and other large scale integrated circuits has increased over the years, the resources devoted to design verification have accounted for an increasingly large percentage of the total resources to develop and manufacture such integrated circuits. Verifying the proper furtherality of advanced microprocessors having multiprocessing capability is now estimated to consume more time, labor, and resources than actual designing such devices.

In order to find hardware and/or software problems it is known to run "test cases" on a software model version of a processor (also called pre-silicon verification). Microprocessor Pre-Silicon functional verification (FV) is typically accomplished by supplying test templates into an automated test case generation tool which produces assembly level instruction sequences that are used as stimuli. Faulty behavior of the design is detected by driving the stimuli into a design simulator and comparing the actual behavior of the design with the expected behavior implied by the input stimuli. These templates are typically produced by engineers to exercise certain Architectural and Micro Architectural functions within the microprocessor. Historically, functional verification (FV) consisted primarily of generating a large number of test programs and cases and running those test programs on a simulator that modeled the device operation. Design and verification engineers frequently generated such test cases manually with the help of various random and specific test generators. As the number of transistors, registers, and other facilities in integrated circuits has increased, conventional verification methods responded by simply increasing the number of tests that are simulated. Unfortunately, generating a seemingly infinite number of tests is inefficient and an unreliable method of verifying the functionality of all components in a complex integrated circuit.

In the early days of microprocessor development, inefficiencies in functional verification systems were tolerated because the size of the test space (measured, for example, by the number of states the microprocessor may assume) was sufficiently small. In addition, early microprocessors typically had fewer functional units than modern microprocessors, and the interactions between the components and functions were well understood and controlled. The increasing number of functional units in microprocessors is significant from a design verification perspective because interaction between functional units can no longer be ignored or only loosely verified by conventional verification and methodologies.

The diverse applications in which modern integrated circuits are employed makes it impossible to predict or plan for the type of software applications that will run on them and the state and interdependence that will be exercised in the field are large and generally nondeterministic. Roughly speaking the test space of a microprocessor is approximately equal to $2^n$ where n represents the number of latches (state storage spaces) within the microprocessor. From this approximation, it will be appreciated that the test space of microprocessors increases exponentially as the number of latches increases.

The conventional approach to functional verification (FV), in which increased complexity in a device is verified by simply increasing the number of tests that are simulated is rapidly becoming infeasible. In addition, because the input to a simulator in a conventional verification process is simply a large number of deterministic tests or randomly generated tests, the output of the simulation is painstakingly evaluated to determine whether a particular simulation was successful in testing the intended functionality of the device. Adding to the cost and time required to perform functional verification (FV) are design modifications that are made during the design process. The design of a complex integrated circuit typically evolves many times during its development as new functionality is added, as design flaws are rectified, as synthesis optimizations are performed on the design to meet timing/sizing requirements constraints, and as pervasive functions such as test logic are added. Regardless of how small a change is to the integrated circuit, it is typically necessary to perform the verification process anew every time the design changes. The time required to re-verify a design is particularly limiting when the design change necessitating the re-verification occurs near the end of the design phase (i.e., close to "tape out", "first silicon", or any other significant step in the completion of the design).

SUMMARY

The summary of the disclosure is given to aid understanding of integrated circuit testing, checking and/or verification methods and/or systems, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the techniques, methods, and/or systems for testing and verifying integrated circuits to achieve different effects.

A method and/or system for pre-silicon verification of an integrated circuit design modified to avoid a hit of property P where property P has a known counterexample is disclosed. The method and/or system in one or more embodiments includes providing a first integrated circuit having one or more bugs, wherein the first integrated circuit hits property P in response to the one or more bugs; providing a second integrated circuit that has been modified in a manner intended to avoid property P; providing one or more inputs to both first integrated circuit and second integrated circuit; and applying a first implication check in an equivalence testbench on the first integrated circuit and on the second integrated circuit to determine whether the second integrated circuit hits property P in the same way as the first integrated circuit hits property P, where the same one or more inputs are provided to the first integrated circuit and the second integrated circuit. Additionally or alternatively the method and/or system includes in an aspect applying a second implication check in an equivalence testbench on the first integrated circuit and on the second integrated circuit to determine whether the second integrated circuit hits property P during any timestep (or cycle) that the first integrated circuit does not hit property P (e.g., whether the second integrated circuit will hit property P at a different timestep (or cycle) than the first integrated circuit hits property P), where the same one or more inputs are provided to the first integrated circuit and the second integrated circuit. The method and/or system in one or more aspects additionally or alternatively includes applying a third implication check in an equivalence testbench on the first integrated circuit and the second integrated circuit to determine whether the second integrated circuit hits property P further along a path than the first integrated circuit hits property P where the same inputs are applied to the first and second integrated circuits during application of the third implication check. The third implication check in one or more aspects is applied in response to the first implication check not hitting property P in the second integrated circuit, and in an optional further aspect in response to the first implication check being provable that the second integrated circuit will not hit property P.

In an embodiment, the method and/or system optionally further includes, in response to the third implication check not hitting property P in the second integrated circuit and it not being provable that the second integrated circuit will hit property P during application of the third implication test, applying at least one of the group consisting of a bounded third implication check, a constrained third implication check, a restrained third implication check, and combinations thereof, in an equivalence testbench to determine whether the second integrated circuit hits property P further along a path than the first integrated circuit hits property P. In a further embodiment, the method and/or system optionally further includes, in response to the third implication check not hitting property P in the second integrated circuit and it being provable that the second integrated circuit will hit property P during application of the third implication test, applying at least one of the group consisting of a less bounded third implication check, a less constrained third implication check, a less restrained third implication check, and combinations thereof, in an equivalence testbench to determine whether the second integrated circuit hits property P further along a path than the first integrated circuit hits property P.

The method and/or system in an embodiment includes applying an output of the first integrated circuit as a first input to an AND gate and applying an output of the second integrated circuit as a second input to the AND gate, wherein the output of the AND gate determines whether property P hits in the second integrated circuit. The method in a further aspect optionally includes applying an output of the first integrated circuit as an input to a NOT gate and applying the output of the NOT gate as a first input to an AND gate, and applying an output of the second integrated circuit as a second input to the AND gate, wherein the output of the AND gate determines whether property P hits in the second integrated circuit.

In one or more embodiments, a system for pre-silicon verification of an integrated circuit design modified to avoid a hit of property P where property P has a known counterexample is disclosed. The system in one or more aspects includes one or more processors having circuitry and logic configured to: receive a first integrated circuit having one or more bugs, wherein the first integrated circuit hits property P in response to the one or more bugs; receive a second integrated circuit that has been modified in a manner intended to avoid property P; create a composite of first integrated circuit and the second integrated circuit; provide one or more inputs to both the first integrated circuit and the second integrated circuit; and apply a first implication check on the first integrated circuit and on the second integrated circuit to determine whether the second integrated circuit hits property P in the same way as the first integrated circuit hits property P, where the same one or more inputs are provided to the first and second integrated circuit. In an aspect the system alternatively or additionally is configured to apply a second implication check on the first integrated circuit and on the second integrated circuit to determine whether the second integrated circuit hits property P during any timestep that the first integrated circuit does not hit property P (e.g., whether the second integrated circuit will hit property P at a different timestep (or cycle) than the first integrated circuit hits property P), where the same one or more inputs are provided to the first integrated circuit and the second integrated circuit. Alternatively or additionally, the one or more processors is further configured to: apply a third implication check on the first integrated circuit and the second integrated circuit to determine whether the second integrated circuit hits property P further along a path than the first integrated circuit hits property P where the same inputs are applied to the first and second integrated circuits during application of the third implication check.

A computer program product is also disclosed for pre-silicon verification of an integrated circuit design modified to avoid a hit of property P where property P has a known counterexample. The computer program product in one or more aspects includes: a computer readable storage medium readable by a processing circuit, the computer readable storage medium containing programming instructions for execution by the processing circuit for performing a method comprising executing a test code by: applying one or more inputs to a first integrated circuit having one or more bugs, wherein in response to the one or more inputs the first integrated circuit hits property P; applying the same one or more inputs to a second integrated circuit that has been modified in a manner intended to avoid property P; and applying a first implication check on the first integrated circuit and on the second integrated circuit to determine whether the second integrated circuit hits property P in the same way as the first integrated circuit hits property P, where the same one or more inputs are applied to both the first and second integrated circuit. Additionally or alternatively, the computer readable storage medium can include programming instructions that when executed by the processor apply a second implication check on the first integrated circuit and on the second integrated circuit to determine whether the second integrated circuit hits property P during any timestep that the first integrated circuit does not hit property P (e.g., whether the second integrated circuit hits property P at a different timestep/cycle than the first integrated circuit hits property P), where the same one or more inputs are provided to both the first and second integrated circuit. Additionally or alternatively, the computer readable storage medium can include programming instructions that when executed by the processor apply a third implication check on the first integrated circuit and the second integrated circuit to determine whether the second integrated circuit hits property P further along a path than the first integrated circuit hits property P. In an embodiment, in response to the third implication check not hitting property P in the second integrated circuit and it not being provable that the second integrated circuit will hit property P during application of the third implication test, applying at least one of the group consisting of a bounded third implication check, a constrained third implication check, a restrained third implication check, and combinations thereof, to determine whether the second integrated circuit hits property P further along a path than the first integrated circuit hits property P.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of methods, techniques, products, instruction programming, and/or systems for testing, checking and/or verifying integrated circuit designs will be better understood when read in conjunction with the figures provided. Embodiments are provided in the figures for the purpose of illustrating aspects, features, and/or various embodiments of the methods, techniques, products, instruction programming, and/or systems for testing, checking, and/or verifying integrated circuit designs, but the claims should not be limited to the precise arrangement, structures, features, aspects, assemblies, subassemblies, systems, circuitry, functional units, embodiments, methods, processes, or devices shown, and the arrangements, structures, assemblies, subassemblies, functional units, features, aspects, methods, processes, circuitry, embodiments, and devices shown may be used singularly or in combination with other arrangements, structures, assemblies, subassemblies, systems, features, functional units, aspects, circuitry, embodiments, methods, processes, and devices.

DETAILED DESCRIPTION

Figure 1:
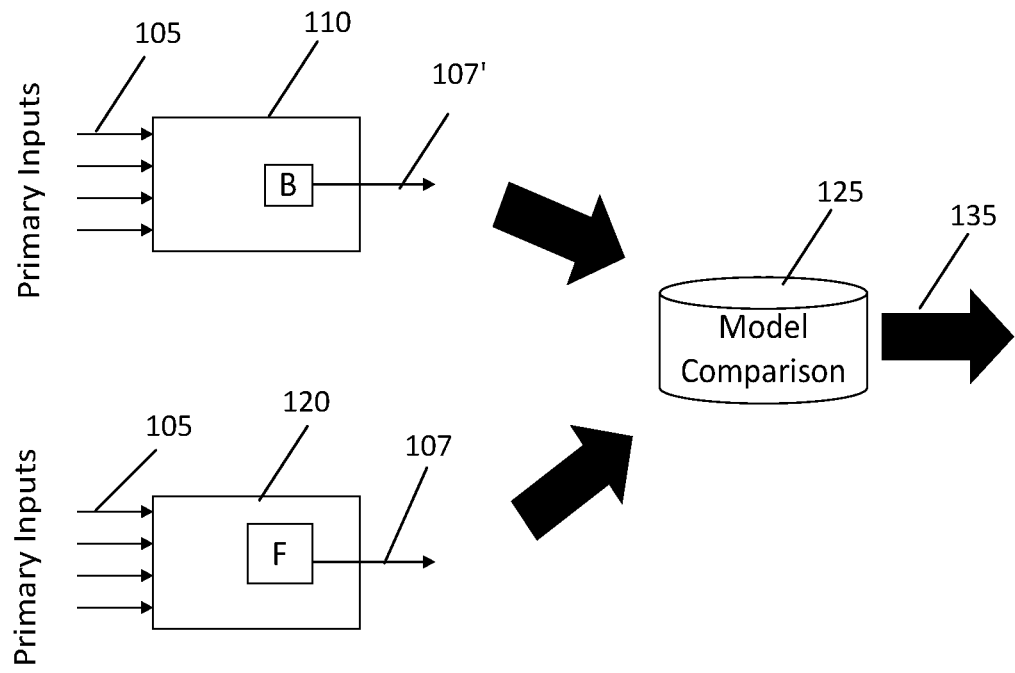
FIG. 1 shows a block diagram of a system to check whether a modification or change to an integrated circuit overcomes a bug in an integrated circuit.

The following description is made for illustrating the general principles of the invention and is not meant to limit the inventive concepts claimed herein. In the following detailed description, numerous details are set forth in order to provide an understanding of methods, techniques and systems for integrated circuit verification, testing and/or checking, however, it will be understood by those skilled in the art that different and numerous embodiments of the testing, checking and/or verification systems, methods, and/or techniques may be practiced without those specific details, and the claims and disclosure should not be limited to the embodiments, subassemblies, features, processes, methods, aspects, features or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes design verification or testing techniques and systems for integrated circuits fabricated on silicon (chips), including processors and microprocessor systems and architectures, which are apparent to those skilled in the art. It is assumed that those skilled in the art are familiar with integrated circuit verification or testing techniques and/or systems, and in particular pre-silicon testing and design verification of processors. It may be noted that a numbered element is numbered according to the figure in which the element is introduced, and is typically referred to by that number throughout succeeding figures.

Design verification and verifying the correctness of hardware designs, for example of processors, is important as once fabricated as silicon (as an integrated circuit), fixing bugs generally require a complete re-spin that incurs high costs. The complexity and large state-spaces of present day designs typically requires using multiple technologies and techniques to establish the correctness of integrated circuit designs, such as, for example, simulation, formal verification, hardware acceleration, emulation, and others. Design verification of hardware processors can be performed by simulation, where the operation of sets of assembly level test cases is simulated using a hardware simulator with a particular set of design parameters and comparing the results with the output predicted by a behavioral simulator. Faulty behavior of the design is detected by driving the stimuli into a design simulator and comparing the actual behavior of the design with the expected behavior implied by the input stimuli. Functional Formal verification (FFV) is particularly useful to ensure lack of bugs conclusively as it explores all the legal states of the design, although FFV can be limited by how large the design slices can be that can be verified with full proofs. Many techniques are used to scale application of FFV, such as decompositions where the design is partitioned into smaller pieces, or abstractions which replace parts of the design with a simpler behavior masking some of the details.

Frequently, the design change under consideration is minor in the sense that the vast majority of latches and other design features are the same in the prior (old) and the modified (new) designs. In such cases, it is natural to assume that the old and new designs are largely the same from a functional perspective. Unfortunately, the cost associated with introducing a chip that has a furtheral flaw or defect is so significant that chip manufacturers must extensively verify even trivial design changes. Significant effort has been devoted to efficiently verifying the functional equivalence of two similar, but not identical designs. Correspondence checking, also referred to as Incremental Verification (IV), has been proposed in the past as a means for carrying forward previously established verification results leveraging equivalence checking techniques looking for changes to a design over time. This approach is particularly attractive in a late design fix or an Engineering Change Order (ECO) setting where the changes to the design are localized to small portions, and the rest of the design remains unchanged. As such incremental verification (IV) tries to carry forward verification results from past attempts to verify the design as it pertains to proof aspects, such as unhittable result, or number of bounded steps checked, etc.

Figure 2:
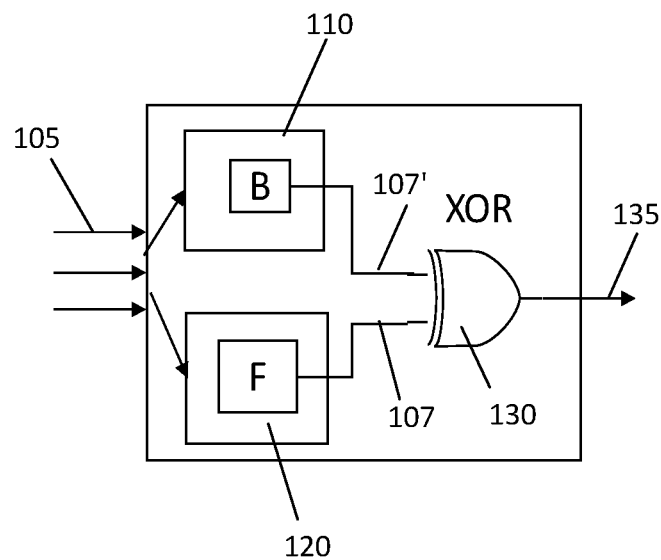
FIG. 2 shows a diagram depicting a system and/or method to check whether a modified circuit design differs on fail property P at the same timestep or cycle and under the same inputs from an earlier, similar integrated circuit design that hit property P.

Referring to FIGS. 1-2, conventional correspondence or sequential equivalence checking (SEC) is performed by creating a set of correspondence signals where each correspondence signal reflects the value (state) of a composite node that is the EXOR product of a node in the old design and the corresponding node in the new design. As shown in FIG. 1, to check for differing outputs 107, 107' on two integrated circuit designs, a common set of stimulus, e.g., identical primary inputs 105, are applied to the previous integrated circuit design 110 and to the new integrated circuit design 120, and a model comparison 125 is performed to compare the outputs 107, 107' of the two integrated circuit designs. The outputs 107, 107' are the inputs to the model checker/comparator 125, which provides an output signal 135. FIG. 2 illustrates the "exclusive or" (EXOR) logic that is applied where the primary inputs 105 are identically applied to both the previous integrated circuit design 110 and the new integrated circuit design 120, and the outputs 107, 107' of both integrated circuit designs 120, 110 are applied as inputs to an exclusive OR gate 130. If the output signal 135, e.g., correspondence signal, is asserted, the furtheral equivalence of the two integrated circuit designs has been negated or disproven for the test under consideration. In other words, the two integrated circuit designs are not equivalent. Verification results are generally classifiable in two distinct classes, namely verification results where a particular signal is asserted (true) or hit, and verification results in which a particular signal is not hit (not true). Verification results where a particular signal is not hit are further broken down into two cases; provable cases where the verification testing conclusively establishes that the signal cannot be asserted under the specified conditions, and unprovable (inconclusive) cases where the inability to assert the signal is inconclusive or unprovable.

Correspondence checking or incremental verification (IV) however does not permit inferring anything about the robustness of a design fix when a past version of the design had one or more bugs. In other words, showing equivalence to a design that includes one or more bugs demonstrates that the new design retained the bugs from the earlier design. A process, system, and/or technique, is disclosed to rule out or abate known paths to the bug, and that overcomes and addresses the observed concerns and shortcomings with bugs in the previous integrated circuit design. The proposed process, system, and/or technique aims to show that some output necessarily changed (a bug detection signal) under some driving of the integrated circuit, by leveraging an equivalence checking model and constraints on the comparison and state space. In the disclosed technique, system and/or process, the output of the fixed integrated circuit is hittable (asserted) along at least one path, and equivalence checking is used to explore those paths where it is unhit. A path is typically a sequence of states such that the first state is an initial state, and each pair of states (s, s') along the path are a valid transaction, i.e., there is an input valuation at s such that the next state is s'. In addition, the integrated circuit design is checked for the possibility that the change allows for paths where an output is asserted in both designs, but at a different timestep or cycle. Paths known to hit a bug in the old design are checked in the new "fixed" design to determine if they can still hit after a purported fix to cope with intractably large testbenches. If all assertions are proven unhittable, it soundly implies correctness of the bug fix.

In this disclosure, incremental verification (IV) based functional formal verification (FFV) of designs is extended to focus on situations where a known bug exists in an old ("buggy") design. A straightforward method to verify whether a design change fixes the bug would be to simply re-simulate traces which show the existence of the bug. This is realistic for only a few known scenarios, as enumerating all traces and paths leading up to the bug will require formal methods-based approaches, making it unscalable. A testbench is disclosed which comprises the previous version of the design incorporating the bug, referred to as the design with Bug or BUG Design (also sometimes referred to as the first integrated circuit design), and a fixed version of the same design with the expectation that the bug has been fixed, referred to as the design with Fix or FIX Design (also sometimes referred to as the second integrated circuit or modified (integrated) circuit). The disclosed method, techniques and/or system leverages similarities between the two versions of the integrated circuits to try to establish: (1) paths leading up to the bug in the BUG Design do not exist in the FIX Design; and (2) The FIX Design does not introduce any new paths which activate a similar or new bug. Collectively testing for both scenarios provides a robust fix for the bug in question (e.g., the BUG Design), and the incremental verification (IV) nature of the testbench set-up allows for scalability to draw conclusive results.

The methods, techniques, and/or systems in one or more embodiments can reduce the state-space required to be explored by virtue of knowing the bug or problem in the old, buggy integrated circuit design and using an incremental verification (IV) testbench which exposes the localized FIX Design change to testing to determine if the bug is fixed, as opposed to a full blown FFV of the FIX Design as a whole. In contrast to previous situations where verification results are carried forward to the next version of the integrated circuit design, the proposed method, technique, and/or system attempts to verify correctness of a target which has been falsified in a previous version of the integrated circuit design and expected to have been fixed. Although not a prerequisite, the method, technique, and/or system is advantageous when the integrated circuit design is relatively stable from the standpoint of design changes, and the FFV testbench and verification targets to go with the integrated circuit design. The results of the proposed method, technique, and/or system in one or more embodiments demonstrate the effectiveness on integrated circuit designs with post-silicon bugs which are limited to small changes to fix the problem to avoid a re-implementation of the design problems, and in one or more aspects complete with resolving issues related to placement and routing on the silicon.

Design verification set-up typically comprises a design-under-test (DUT), e.g., a Design with Fix or FIX Design, and a testbench which drives traffic into the DUT and checks for proper operation of the DUT, e.g., the FIX Design. The set-up inclusive of the DUT and testbench is typically transformed into a netlist or another suitable representation of a circuit structure and a set of expected values at one or more of the circuit's nets that are to be proven or disproven. An expected value is proven if a state or sequence of states produces the expected value on the specified circuit net(s).

Suppose there is a very large design with bugs, e.g., BUG Design, and a property P that has a known counterexample. A counterexample is a specific example that shows a general statement is not true, e.g., an example that disproves a universal statement or is an exception to a general rule. The disclosed method, technique, and/or system is implemented to determine whether a fixed integrated circuit design, e.g., FIX Design, intended to avoid hits of property P, actually does so. The proposed method, technique, and/or system seeks to show that driving FIX Design in the same manner that BUG Design hit property P will not hit property P in FIX Design. With fixes that are sufficiently small and localized, a composite testbench which includes both the BUG Design and FIX Design(s) can efficiently achieve such a proof. In a testbench comparing BUG Design 110 and FIX Design 120 in a model comparator/comparison 125 as shown in FIG. 1, it is desirable to show that BUG.P=>not FIX.P is invariant or unchanged, when both integrated circuit designs are driven with the same primary inputs that hit property P, where "=>" means implies logic. So for example, A=>B can be expressed as (NOT A) or B, and the truth table for A=>B, as suggested by this equivalence, is

A|B|A=>B
0 0 1
0 1 1
1 0 0
1 1 1

Using standard logic equivalences, where <==> means logical equivalence, i.e., "if and only if":

BUG.P=>not FIX.P is invariant (unchanged)<==>
not (BUG.P=>not FIX.P) is unreachable<==>
not (not BUG.P or not FIX.P) is unreachable<==>
BUG.P and FIX.P is unreachable.

Figure 3:
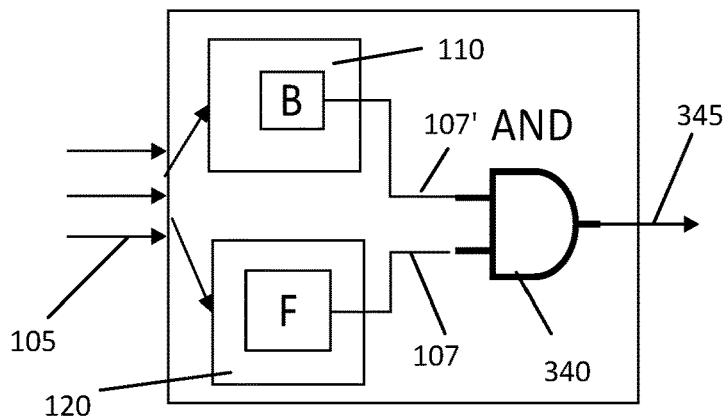
FIG. 3 shows a diagram depicting a system and/or method to check whether a modified circuit design hits property P at the same timestep or cycle and under the same inputs as an earlier, similar integrated circuit design hit property P.

The testbench for comparing BUG Design 110 and FIX Design 120 to determine if BUG.P=>not FIX.P is shown in FIG. 3, where the primary inputs 105 are identically applied to BUG Design 110 and FIX Design 120, including specifically the primary inputs 105 that drive bug output, e.g., property P hit, in BUG Design 110. The output signals 107, 107' of each integrated circuit design 110, 120 are fed into AND gate 340 to determine if property P is hit the same way in both integrated circuit designs 110, 120. That is the output 345 of AND gate 340 will show whether or not the property P was hit in the same way in both BUG Design 110 and FIX Design 120. If the output signal 345 of AND gate 340 is not hit (not true), then FIX Design 120 does not demonstrate property P when the inputs 105 to FIX Design 120 are the same inputs 105 that drive the bug (failure) in BUG Design 110. As an assertion, which the model checking tool of FIG. 3 will determine is hittable or unhittable, this is written as:

assert: BUG.P and FIX.P // impl_check_1.

In some cases, this is much easier to verify as unhittable in an SEC testbench then checking:

assert: FIX.P // direct in a property checking testbench for the FIX Design 120.

In addition, to verify the new FIX Design 120, any paths in BUG Design 110 that did not hit property P is checked in FIX Design 120 so that FIX Design 120 continues to not hit property P, that is, the FIX Design 120 is checked to determine that it did not introduce any new bug(s). In other words, FIX design is checked to determine whether FIX Design hits property P during any timestep or cycle that Bug Design does not hit property P. In the testbench of FIG. 1, BUG Design 110 and FIX Design 120 are compared in model comparator/comparison 125 to determine if not BUG.P=>not FIX.P is invariant or unchanged. Using standard logic equivalences:

not BUG.P=>not FIX.P is invariant<==>
not (not BUG.P=>not FIX.P) is unreachable<==>
not (BUG.P or not FIX.P) is unreachable<==>
not BUG.P and FIX.P is unreachable.

Figure 4:
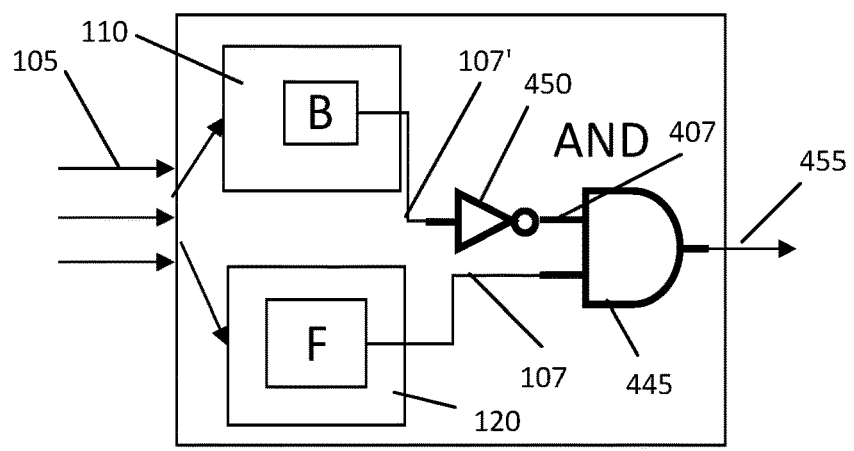
FIG. 4 shows a diagram depicting a system and/or method to check whether a modified circuit design hits property P at a different cycle (implying in a different way) than an earlier, similar integrated circuit design hit property P.

The testbench for comparing BUG Design 110 and FIX Design 120 to determine if not BUG.P=>not FIX.P is shown in FIG. 4, where the primary inputs 105 are identically applied to BUG Design 110 and FIX Design 120. As an assertion, which the model checking tool of FIG. 4 will determine is hittable or unhittable, this is written as:

assert: not BUG.P and FIX.P // impl_check_2.

The output signal 107' of BUG Design 110 is fed into a NOT gate (inverter) 450 and the output 407 of NOT gate 450 is fed to and is the input to AND gate 445. The output signal 107 of FIX Design 120 is fed into the second input of AND gate 445. The output 455 of the AND gate 445 is used to determine if property P is hit in FIX Design 120 in a manner in which it was not originally hit. That is, the output 455 of AND gate 340 will show whether or not the property P was hit in FIX Design 120. If the output signal 455 of AND gate 40 is not hit (not true), then FIX Design 120 does not demonstrate property P given the inputs 105 to FIX Design 120. If on the other hand, the output 455 is a hit (true), then the FIX Design 120 introduced a new path to property P and the redesign is a fail. In most cases, it is much easier to verify for FIX Design 120 assert: not BUG.P and FIX.P // impl_check_2 as unhittable in an SEC testbench then checking:

assert: FIX.P // direct in a property checking testbench.

Since in one or more embodiments the BUG Design is known to hit property P at some timestep or cycle along some path, checking whether FIX Design hits property P during any timestep or cycle that BUG Design does not hit property P, hits of implication check 2 reveals a different way to hit property P.

Verifying impl_check_1 or impl_check_2 in SEC does not rule out the possibility of traces where BUG.P asserts and FIX.P asserts at a different timestep or cycle. This is a very real possibility if the bug is the result of a timing misspecification, which when the integrated circuit design is fixed affects the timing of latches involved in property P. To check if property P will assert at a different timestep or cycle in FIX Design, define latches that track if BUG.P and FIX.P has been hit (with appropriate clock domain 'clk'):

bug_p_hit<=delay(1, bug_p_hit)@(clk) or BUG.P;
fix_p_hit<=delay(1,fix_p_hit)@(clk) or FIX.P;

where <= is used as an assignment operator which means to evaluate the right hand side (RHS) of symbol <= to determine if the value is a 0 or a 1 and assign this to the signal on the left hand side (LHS) of the symbol <=. As an assertion, no traces along which both BUG.P and FIX.P are hit with any offset/window is written as:

assert: bug_p_hit and fix_p_hit // impl_check_3.

In a testbench comparing BUG Design 110 and FIX Design 120 in a model comparator/comparison 125 as shown in FIG. 1, it is desirable to determine if BUG.P and FIX.P hit, and in an aspect whether property P is hit further along a path in the FIX Design 120 than in the BUG Design 110.

Figure 5:
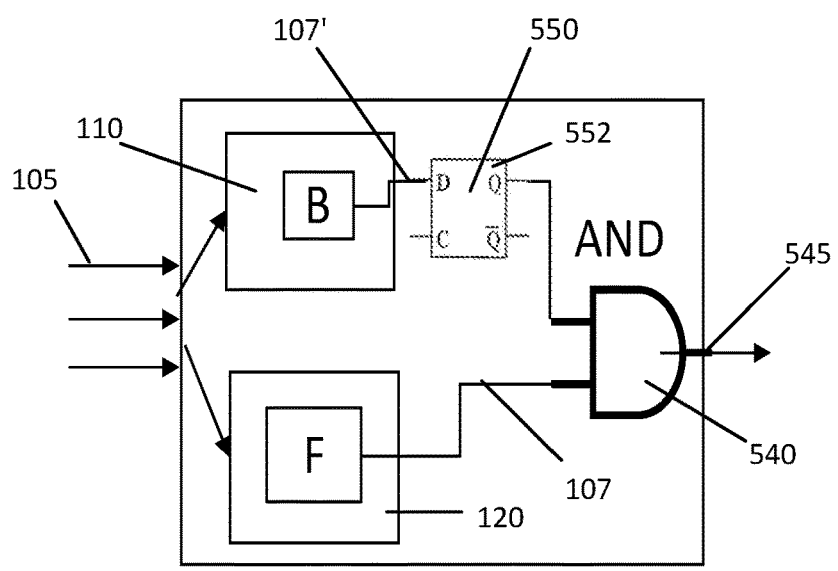
FIG. 5 shows a diagram depicting a system and/or method to check whether a modified circuit design hits property P further along a path than an earlier, similar integrated circuit design hit property P.

The testbench for comparing BUG Design 110 and FIX Design 120 to determine if BUG.P and FIX.P hit further along a path is shown in FIG. 5, where the primary inputs 105 are identically applied to BUG Design 110 and FIX Design 120. In this first scenario of FIG. 5, where no bounds, constraints, and/or restraints are applied, the output signals 107, 107' of each design 110, 120 are fed into an AND gate 540 to determine if property P hits further along a path in the BUG Design and the FIX Design 120. That is the output 545 of AND gate 540 will show whether or not the property P hit in both BUG Design 110 and FIX Design 120. If the output signal 545 of AND gate 540 is not hit (not true), then FIX Design 120 does not demonstrate property P. If the output signal 545 is hit it means that the FIX Design 120 just delayed the path to failure and the integrated circuit needs further redesign.

This unbounded and unconstrained check on the FIX Design 120 can lead to a check that is as difficult as, if not more difficult than, direct testing, because along any path where bug_p_hit has asserted, a DUT reset could occur which transitions to an initial state. With the bug_p_hit criteria satisfied, model checking begins from the initial state searching for fix_p_hit, or equivalently, FIX.P. To overcome this, in one or more embodiments the search is bounded, constrained, and/or restrained to a more tractable and yet interesting space.

In one or more embodiments:

assert: bug_p_hit and fix_p_hit// impl_check_3 can be bounded and/or constrained. For example, if the known BUG.P hit case occurs in BUG Design at timestep (or cycle) X, then impl_check_3 is typically run and is verified up to timestep (or cycle) X (or just beyond) that there are no paths where impl_check_3 is hit. That is, the state space for hits of impl_check_3 are checked up to timestep (or cycle) X, and only check beyond timestep (or cycle) X in FIX Design where BUG.P has been asserted in BUG Design within timestep (or cycle) X. Typically, bounding the check and/or test involves choosing a timestep or cycle X that is beyond the timestep or cycle that the BUG Design is known to hit property P. So for example if BUG Design hits property P at timestep or cycle H, then timestep/cycle X is chosen to be greater than timestep/cycle H. The following signal and assumption is added to the equivalence checking model, referred to as the bounded model (as opposed to the unbounded model that does not have this assumption).

bound_cnt<=delay(1, offset_cnt)@(clk)+1; // initialized to 0
assume: (bound_cnt<=X) or bug_p_hit // bound_constr Depending on the nature of the solving algorithm invoked this can help tractability substantially by virtue of channeling the search towards only those paths/states which will cause BUG.P_hit to be asserted. In a testbench comparing BUG Design 110 and FIX Design 120 in a model comparator/comparison 125 as shown in FIG. 1, it is desirable to determine if BUG.P and FIX.P hit, and in an aspect whether property P is hit further along a path in the FIX Design 120 than in the BUG Design 110, where the BUG Design 110 is hit in X cycles (Bound count).

The testbench for comparing BUG Design 110 and FIX Design 120 to determine if BUG.P and FIX.P hit further along a bounded path is shown in FIG. 5, where the primary inputs 105 are identically applied to BUG Design 110 and FIX Design 120. In this second scenario of FIG. 5, where the number of cycles run is bounded, the output signals 107, 107' of each design 110, 120 are fed into an AND gate 540 to determine if property P hits further along a path in the FIX Design 120. That is, the output 545 of AND gate 540 will show whether or not the property P hit in both the BUG Design 110 and FIX Design 120 where property P hits in the BUG Design 110 in a number X timesteps or cycles, and continues checking for property P in FIX Design for an infinite number of timesteps or cycles. If the output signal 545 of AND gate 540 is not hit (not true), then FIX Design 120 does not demonstrate property P. If the output signal 545 is hit, it means that the FIX Design just delayed the path to failure and the integrated circuit (FIX Design) needs further redesign. In FIG. 5, one of several, or any number of bounds, constraints, and/or restraints represented by constraints unit 550 are applied, where D (551) represents no bounds or constraints, and Q (552) represents bounding the number of timesteps or cycles to hit property P in the BUG Design 110 and then continuing unbounded to check and verify for property P in FIX Design 120.

Figure 6:
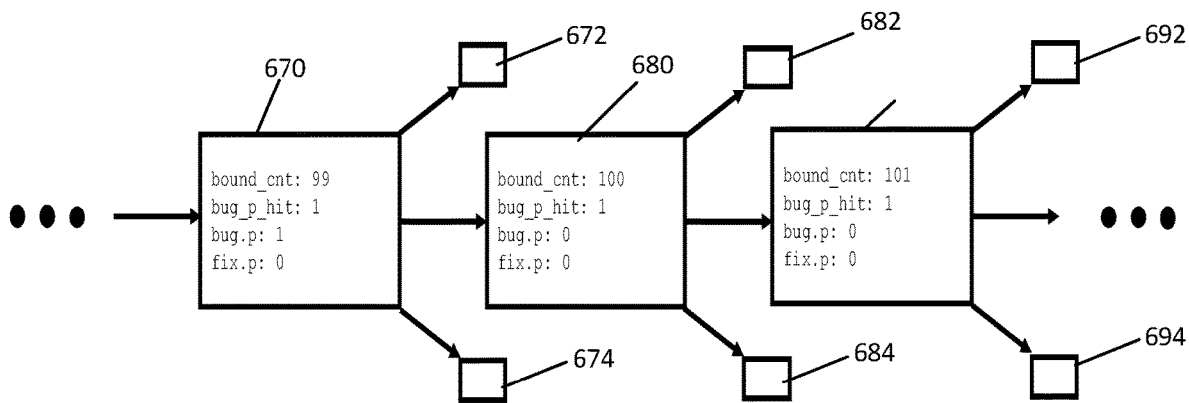
FIG. 6 shows a diagram depicting a system and/or method to check whether a modified circuit design hits property P further along a path than an earlier, similar integrated circuit design hit property P, where the testing to determine if the earlier, similar integrated circuit design hits property P is bounded to checking for a number X timesteps or cycles.

FIG. 6 represents a branching path sequence where BUG.P has been encountered in BUG Design within specified bounds, e.g., where bound X is 100 timesteps or cycles in FIG. 6, and the branching search for property P continues unboundedly in FIX Design. In FIG. 6 at 670, the count is at 99, the test is searching for bug_p_hit, and property P has been hit in the BUG Design (BUG.P hit within bound (timestep/cycle) of 100) as indicated by "bug.p: 1" at count 99 in 670. In the example of FIG. 6, the checking continues unbounded as indicated by 680, 690, and the continuing bullet points. As shown in FIG. 6, the searching continues along different paths 672, 674; 682, 684; and 692, 694.

The bounded model can be further augmented with constraints to further help tractability. The first constraint bounds the window of time along a path between when BUG.P and FIX.P are asserted, so that once either bug_p_hit or fix_p_hit asserts, there is a bounded number of timesteps Y to search for impl_check_3. This maintains the focus on traces that are 'similar' in both designs, by searching for a path q that hits property P in one of BUG Design or FIX Design, and then searches for an extended path r where concat(q, r) hits in the other property. The bounded model with this constraint, called window(Y), adds one signal, one counter and one assumption:

one_p_hit<=bug_p_hit xor fix_p_hit;
offset_cnt<=(delay(1, offset_cnt)@(clk)+'1') when one_p_hit else '0';
assume: offset_cnt<=Y // offset_constr Once either FIX.P or BUG.P is hit, search for property P in the other integrated circuit design (other logic) will continue for at most Y timesteps or cycles. In a testbench comparing BUG Design 110 and FIX Design 120 in a model comparator/comparison 125 as shown in FIG. 1, it is desirable to determine if BUG.P and FIX.P hit, and in an aspect whether property P is hit further along a path in the FIX Design 120 than in the BUG Design 110, where the FIX Design 120 is checked Y timesteps or cycles (the offset count) past where property P asserted in BUG Design 110.

The testbench for comparing BUG Design 110 and FIX Design 120 to determine if BUG.P and FIX.P hit further along a bounded path is shown in FIG. 5, where the primary inputs 105 are identically applied to BUG Design 110 and FIX Design 120. In this third scenario of FIG. 5, the output signals 107, 107' of each design 110, 120 are fed into an AND gate 540 to determine if property P hits further along a path in the BUG Design and the FIX Design 120 that is checked a number Y timesteps or cycles beyond where property P hit in the BUG Design 110. That is, the output 545 of AND gate 540 will show whether or not the property P hit in both BUG Design 110 and FIX Design 120 where the test is run for a number Y timesteps or cycles after the property P is hit in the BUG Design 110. If the output signal 545 of AND gate 540 is not hit (not true), then FIX Design 120 does not demonstrate property P for Y timesteps or cycles after the property P hit in the BUG Design 110. If the output signal 545 is hit it means that the FIX Design 120 just delayed the path to failure and the integrated circuit (FIX Design 120) needs further redesign. In FIG. 5, one of several, or any number of, bounds, constraints, and/or restraints represented by constraint unit 550 are applied, where D (551) represents no bounds or constraints, Q (552) represents bounding the number of timesteps or cycles to hit property P in the BUG Design 110 and then continuing unbounded to check and verify for property P in FIX Design 120, and C (553) represents checking BUG design 110 to determine if property P hits within a number of X timesteps or cycles, and then checking FIX Design 120 to determine if it hits property P within Y timesteps or cycles past when BUG Design 110 hits property P.

Figure 7:
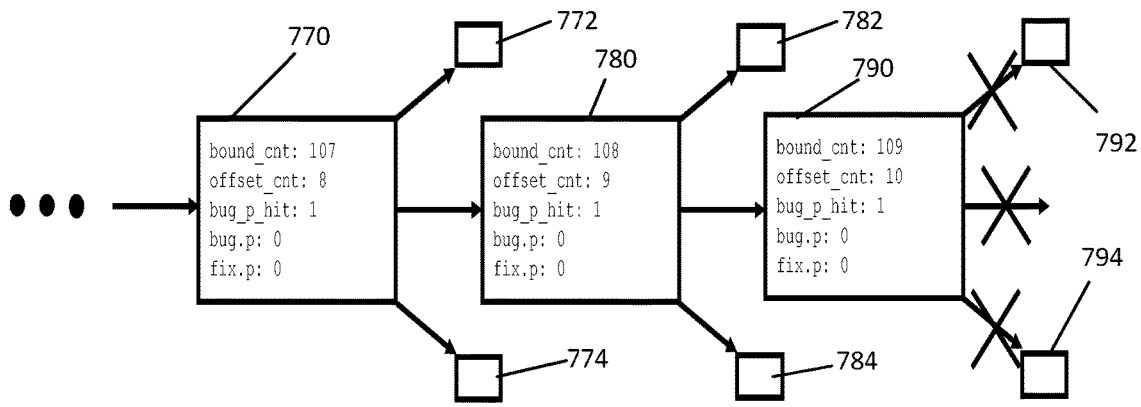
FIG. 7 shows a diagram depicting a system and/or method to check whether a modified circuit design hits property P further along a path than an earlier, similar integrated circuit design hit property P, where the testing is bounded to a number X timesteps, and constrained to a window or offset.

FIG. 7 represents a branching path sequence where BUG.P has been encountered in BUG Design 110 within specified bounds, e.g., where bound X is 100 timesteps or cycles in FIG. 7, and the search for property P continues in FIX Design 120 for Y timesteps or cycles (Window/offset Y) past when property P hit in BUG Design 110. The example of FIG. 7 is a continuation of FIG. 6 (with window Y criteria set at 10 timesteps or cycles). In FIG. 7, as in FIG. 6, BUG Design 110 hit property P at timestep/cycle 99, and the search and/or check for property P in FIX design 120 continues for a specified number Y timesteps or cycles past when property P hit in BUG Design 110, where Y in the example of FIG. 7 is set at 10 timesteps or cycles. FIG. 7 shows at 770, the timestep/cycle count is at 107, and the offset count is eight (8), e.g., the number of timesteps or cycles past when property P hit at count 99 is eight (8). The searching continues at timestep/cycle count 107 along different paths 772, 774. In the example of FIG. 7, the checking continues at 780, where the offset count is 9, and continues at 790 where the offset count reaches 10, the limit specified, and the checking stops. As shown in FIG. 7, the searching continues along different paths 772, 774; 782, 784; and 792, 794. In the example of FIG. 7, property P did not hit in the FIX Design 120 in the specified window/offset Y of 10 timesteps or cycles. While the offset count/window Y in the example of FIG. 7 is 10 timesteps or cycles, it should be appreciated that the offset count Y, also referred to as window Y, can be preprogrammed or predetermined at different values, and/or can be varied or programmable.

The second constraint is a restriction on driving. In addition to window(Y), the user defines a 'default driving' D that is deterministic; for every state of the driver, there is exactly one set of inputs allowed to stimulate the DUT. Now, the SEC model checking proceeds such that once the BUG.P (or FIX.P) is hit, only the default driving is used. This bounds the exploration and 'flushes' through any traffic in-flight, while still adhering to the driving specification. The default driving can be specified manually in a user-directed manner, or can be chosen automatically by a preprocessing tool, for example, where all random bits consulted return a fixed value. The default driving is specified D, and this restraint is referred to as default_driving(D).

one_p_hit<=bug_p_hit xor fix_p_hit;
   default_driving<=delay(1, default_driving)@(clk) or one_p_hit;
   and instances of random_bit r replaced with gate(not default_driving, r).

This way, we avoid the situation of allowing the DUT to be driven to a power on (i.e., reset) state and then arbitrarily driven going forward. In a testbench, comparing BUG Design 110 and FIX Design 120 in a model comparator/comparison 125 as shown in FIG. 1, it is desirable to determine if BUG.P and FIX.P hit, and in an aspect whether property P is hit further along a path in the FIX Design 120 than in the BUG Design 110, where once either BUG Design 110 or FIX Design 120 is hit, there is only one set of inputs permitted to stimulate the DUT, e.g., only the default driving is used on the designs.

The testbench is shown in FIG. 5 for comparing BUG Design 110 and FIX Design 120 to determine if BUG.P and FIX.P hit further where the driving is restricted to the driving that resulted in property P hitting in BUG Design is used and where the primary inputs 105 are identically applied to BUG Design 110 and FIX Design 120. In this fourth scenario of FIG. 5, the output signals 107, 107' of each integrated circuit design 110, 120 are fed into an AND gate 540 to determine if property P hits further along a path in the BUG Design and the FIX Design 120 where driving the integrated circuit designs is restricted after property P hits in BUG Design to the driving D that resulted in the property P hit in the BUG Design to a number Y timesteps or cycles beyond when property P hit in the BUG Design 110. That is, the output 545 of AND gate 540 will show whether or not the property P hit in both BUG Design 110 and FIX Design 120 where the input to the integrated circuit designs is restricted to driving D after property P is hit in the BUG Design 110. If the output signal 545 of AND gate 540 is not hit (not true), then FIX Design 120 does not demonstrate property P when driven at the restricted driving D inputs after the property P hit in the BUG. Design 110. If the output signal 545 is hit it means that the FIX Design 120 just delayed the failure and the integrated circuit (FIX Design 120) needs further redesign. In FIG. 5, a latch 550 is set and remains set once property P is hit in the BUG Design 110; e.g., once D 107' asserts, Q 552 remains asserted. With no bounds or constraints, the check of FIG. 5 determines if property P is hittable in the BUG Design 110 at the same timestep or early than property P is hittable in the FIX Design 120. In FIG. 5, one of several, or any of, bounds, constraints, and/or restraints are applied. A timestep bound X limits the number of timesteps or cycles to hit property P in the BUG Design 110 whereby Q 552 asserts and continues unbounded for unlimited timesteps or cycles to hit property P in the FIX Design 120. A window constraint Y limits the number of timesteps or cycles to hit property P in the FIX Design 120 after property P is hit in the BUG Design 110 and Q 552 asserts. A driving D restricts the valuations of the inputs 105 to both designs 110, 120 from many possibilities to a single valuation, applied after property P is hit in the BUG Design 110 and Q 552 asserts.

Figure 8:
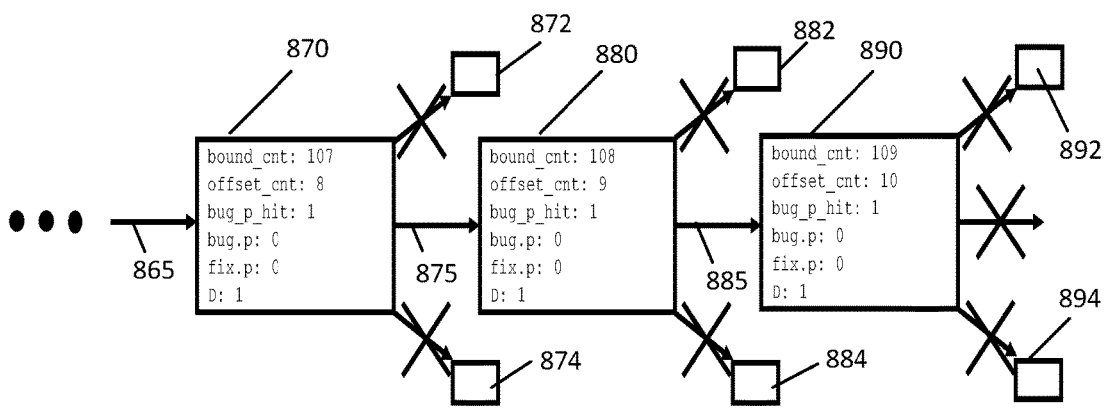
FIG. 8 shows a diagram depicting a system and/or method to check whether a modified circuit design hits property P further along a path than an earlier, similar integrated circuit design hit property P, where the testing is bounded to a number X timesteps, constrained to a window or offset Y timesteps, and restrained to a single input driving D.

FIG. 8 represents a branching path sequence where BUG.P has been encountered within specified bounds, e.g., where bound X is 100 timesteps or cycles in FIG. 8, and the search for property P continues in FIX Design 120 for Y timesteps or cycles (Window Y) past when property P hit in BUG Design 110 and the driving inputs D are restricted to the driving inputs D that resulted in BUG Design hitting property P. The example of FIG. 8 is a continuation of FIG. 7 (with default driving D applied). In FIG. 8, as in FIG. 6, BUG Design 110 hit property P at timestep or cycle (count) 99, and the search and/or check for property P in FIX design 120 continues as in FIG. 7 for a specified number Y timesteps cycles (counts) past when property P hit in BUG Design 110, where Y in the example of FIG. 8 is set at 10 timesteps/cycles. In addition, in the example of FIG. 8, the integrated circuit designs are driven at default driving D, which is illustrated as "D:1" where the default driving D is the driving inputs that resulted in BUG Design 110 hitting property P. FIG. 8 shows at 870, the timestep/cycle count is at 107, and the offset count is eight (8), e.g., the number of timesteps/cycles past when property P hit at count 99 is eight (8). As illustrated in FIG. 8, the default driving D limits the testing to a unique single path, where alternative paths 872, 874 are not viable, as default driving limits the integrated circuits to unique path 875 to state 880. In the example of FIG. 8, the checking continues at 880 where the offset count is 9, and continues at 890 where the offset count reaches 10, the limit specified, and the checking stops. Alternative paths 882, 884; and 892, 894 are not taken with driving D begin applied in the example of FIG. 8. As illustrated in FIG. 8, the testing is limited to a unique path 865, 875, 885 to states 870, 880, 890. In the example of FIG. 8, property P did not hit in the FIX Design 120 in the specified window/offset Y of 10 timesteps or cycles. While the offset count/window Y in the example of FIG. 8 is 10 timesteps or cycles, it should be appreciated that the offset count Y, also referred to as window Y, can be preprogrammed or predetermined at different values, and/or can be varied or programmable. In addition, in FIG. 8, after BUG Design 110 hits property P, the integrated circuits 110, 120 are driven at default D. Default D is shown in FIG. 8 as a single driving, however, it should be appreciated that driving D of the integrated circuits 110, 120 can be one or more driving, and the driving can be predetermined, preprogrammed, varied, and/or programmable, and the default driving D can be specified by a user, or automatically selected by a preprocessing tool.

Specifying these options as a cross product of models {unbounded, bounded(X)} and the 4 constraint options {none, window(Y), default_driving(D), both} as illustrated by constraints unit 550, 4 cases are covered of increasingly constrained models:
 (unbounded, none)
 (bounded(X), none)
 (bounded(X), window(Y))
 (bounded(X), window (Y) and default_driving (D))
However, as shown in FIG. 5 by constraints unit 550, all 8 combinations may be used in an effort to prove/disprove impl_check_3, empowering the user with options to leverage design specific knowledge.

Figure 9:
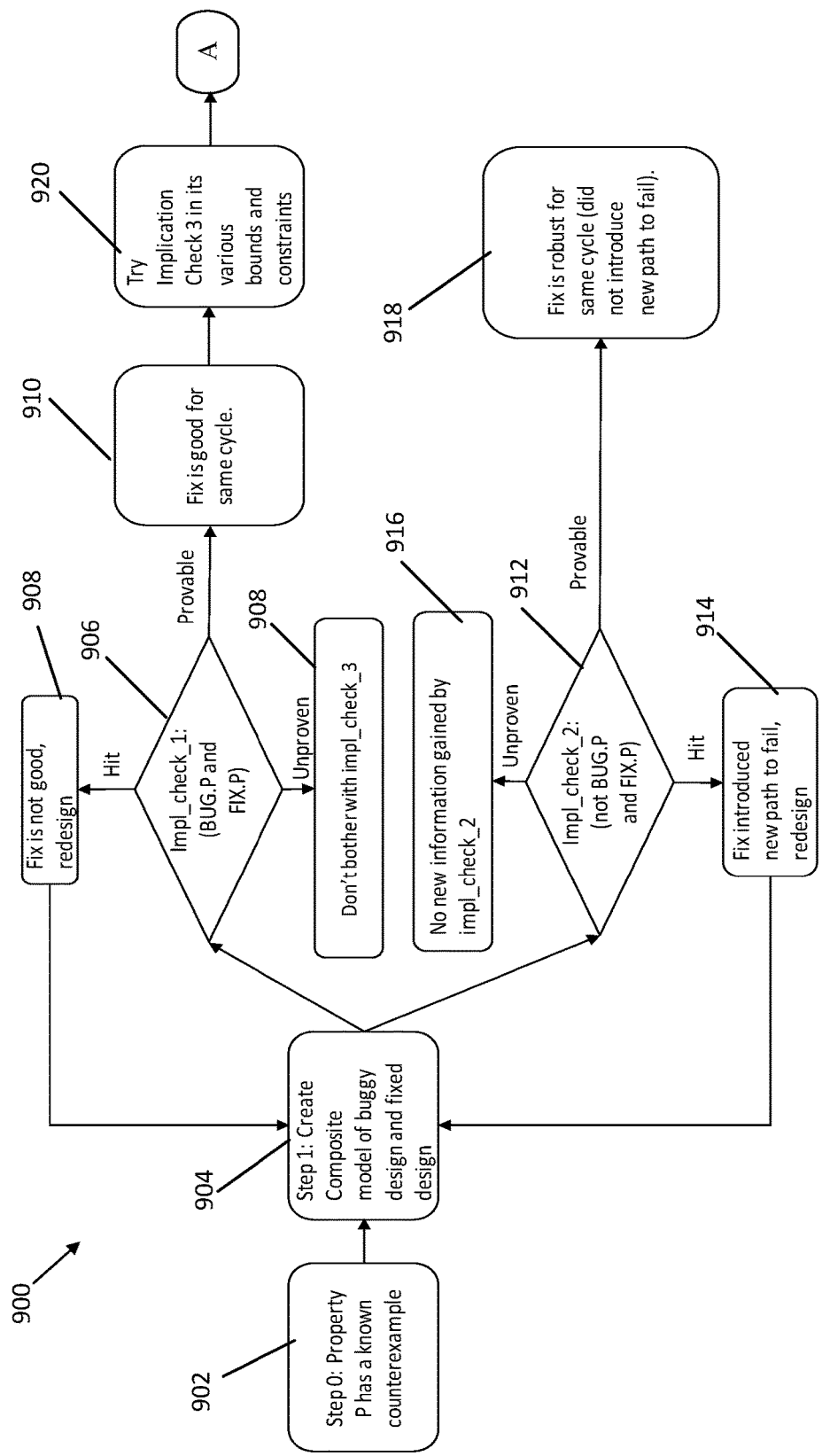
FIG. 9 is a flowchart illustrating and describing an example method for testing whether a modified circuit design hits property P at the same timestep with the same input as an earlier, similar integrated circuit design, and/or whether the modified circuit design hits property P during any timestep that the earlier, similar integrated circuit design did not hit property P.
Figure 10:
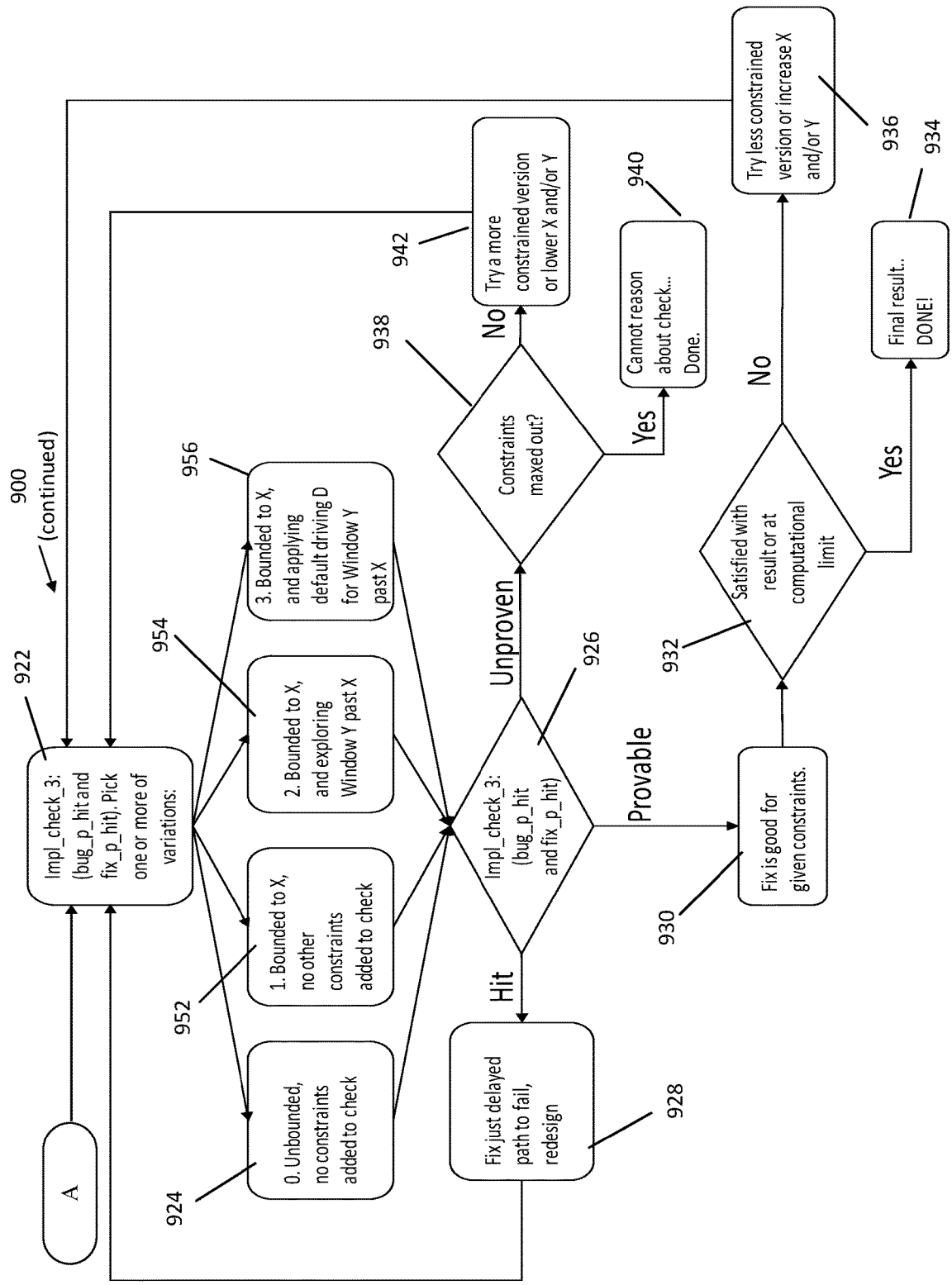
FIG. 10 is a continuation of the flowchart and example method of testing modified integrated circuit design of FIG. 9, to further determine whether the modified integrated circuit hits property P further along possible paths than an earlier, similar integrated circuit design.

FIGS. 9-10 outlines an exemplary flowchart in accordance with various embodiments illustrating and describing a method of testing, checking, and/or verifying an integrated circuit design, including in an aspect whether a modified integrated circuit design fixed one or more bugs in an old, previous integrated circuit, optionally in one or more embodiments using one or more bounds, constraints, and/or restrictions. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 9-10 but the process can be integrated and/or one or more steps can be performed together, simultaneously, or the steps can be performed in the order disclosed or in an alternate order.

In process 900 at 902, a first integrated circuit having one or more bugs is provided, referred to as BUG Design, and a second integrated circuit that includes changes intended to fix the one or more bugs in the first integrated circuit is provided, referred to as FIX Design. The bug in the BUG Design is represented as an undesirable property P that hits, and the FIX Design is intended to avoid hits of property P. At 902 the property P has a known counterexample, where a counterexample is a specific example that shows a general statement is not true, e.g., an example that disproves a universal statement or an exception to a general rule. At 904 a composite model of BUG Design and FIX Design is created. At 906 impl_check_1 is applied/run on BUG Design and FIX Design to determine whether property P is hit in FIX Design with the same primary inputs in same manner (at same timestep/cycle) as the BUG Design. That is at 906 it is determined whether property P is hit in the same way in both BUG Design and FIX Design. If property P is hit in FIX Design (906: Yes/Hit), then at 908 the fix to the bug did not work and the FIX Design or BUG Design needs to be redesigned (FIX Design 2) to avoid property P. After 908, the redesigned circuit (FIX Design 2) and the BUG Design at 904 are used to create a composite model which is then checked and/or tested. On the other hand, if at 906 it is unprovable whether or not property P hits in FIX Design (906: Unprovable), then further testing using impl_check_3 is not undertaken at 908. If in a further case, at 906, it is provable that property P will not hit in FIX Design (906: provable not to hit), then, at 910, FIX Design is good and does not hit property P with the same primary inputs at the same cycle as the BUG Design.

The process 900 can also continue optionally after 904, to 912 where impl_check_2 is run/applied on the composite of BUG Design and FIX Design to determine whether property P is hit in FIX Design at any cycle or timestep that property P does not hit in BUG Design. In a manner impl_check_2 is run to determine if FIX Design hits property P in a different way, e.g., at the same timestep or cycle as in BUG Design but in a manner that BUG Design does not hit. The process 900 can continue at 912 simultaneously with, substantially simultaneously with, or after 906. If there is a hit at 912 while running impl_check_2 (912: Hit), then at 914 FIX Design has a new path to Property P and is a fail. The integrated circuit, e.g., BUG Design and/or FIX Design, should be redesigned (FIX Design 2 or 3) at 914, and the redesigned integrated circuit (FIX Design 2 or 3) and BUG Design proceed to 904 to create a composite model of BUG design and redesigned integrated circuit (FIX Design 2/3). If impl_check_2 is not provable at 912 (912: Unprovable), then at 916 no new information is gained by impl_check_2. If impl_check_2 is provable at 912 (912: Provable), then FIX Design at 918 is robust and good for the same cycle (did not introduce new path to fail at same cycle).

The process 900 can also continue optionally after 910, to 920 where impl_check_3 is run/applied on the composite of BUG Design and FIX Design to determine whether property P is hit further along a path in the FIX Design than in the BUG Design, where impl_check_3 can be run under no, one, and/or various bounds, constraints, and/or restraints. The process 900 can continue at 920 simultaneously with, substantially simultaneously with, or after 912-918. At 922 impl_check_3 is run/applied on the composite BUG Design and FIX Design to determine whether property P in FIX Design is hit along a path at a different timestep or cycle than it was in BUG Design. At 924, optionally, impl_check_3 is run with no bounds, constraints, or restrictions to determine whether property P is hit in FIX Design. At 926 it is determined whether impl_check_3 hit with no bounds, constraints, or restrictions, and if at 926 it is determined that FIX Design undergoing impl_check_3 hits property P (926: Hit), then the FIX Design just delayed the path to fail, and in one or more embodiments the FIX design or BUG Design is redesigned (FIX Design 2, 3, or 4) at 928. The process 900 after 928 can proceed to 922 where the redesigned integrated circuit (FIX Design 2, 3, or 4) undergoes impl_check_3, and/or the process continues to 904 where a composite model of redesigned integrated circuit (FIX Design 2, 3, or 4) and BUG Design is created and undergoes impl_check_1 and/or impl_check_2.

If at 926 it is determined that impl_check_3 is provable (926: Provable), than the process continues to 930 where it is determined that FIX Design is good for the applied bounds, constraints, and/or restrictions. At 932 it is determined whether impl_check_3 is at the computational limit, and or whether the user/verification tester is satisfied with the result. If satisfied with the result of the FIX Design and/or at the computational limit (932: Yes), then at 934 FIX Design is good and no further testing is necessary. If not satisfied with the result, or not at the computational limit (932: No), then at 936 impl_check_3 with less constrained testing is applied. Returning to the results of impl_check_3 at 926, if it is determined that impl_check_3 is not provable (926: Unprovable), then the process continues to 938 where it is determined whether the constraints are maxed out. If at 938 the constraints are maxed out (938: Yes), then at 940 nothing can be inferred from impl_check_3. If at 938 the constraints are not maxed out (938: No), then at 942 a more constrained version of impl_check_3 can be implemented and process 900 continues back to 922 and either one of 952, 954, 956, and/or combinations thereof can be implemented/applied.

For example, at 952, impl_check_3 of FIX Design is bounded to a number of timesteps or cycles X for property P to hit in BUG Design, and if BUG Design hits property P within X timesteps or cycles, then FIX Design can be checked for an unbounded number of timesteps or cycles. At 926 the result of bounded impl_check_3 952 is checked, and if bounded impl_check_3 952 is hit (926: Hit), then process 900 continues to step 928; if bounded impl_check_3 952 is provable (926: Provable), then process 900 continues to steps 932-936; and if bounded impl_check_3 952 is not provable (926: Unprovable), then process 900 continues to steps 938-942 and loops back to 922 where one of one or more bounds, constraints, and/or restrictions is applied, e.g., 954, 956 or combinations of 952, 954 and/or 956. In another example, at 954, impl_check_3 can be bounded to X timesteps or cycles, e.g., 100 timesteps or cycles to hit property P in BUG Design, and further constrained to searching for property P in FIX Design for only Y timesteps or cycles past when property P hits in BUG Design. At 926 the result of bounded/constrained impl_check_3 954 is checked, and if bounded/constrained impl_check_3 954 is hit (926: Hit), then process 900 continues to step 928; if bounded/constrained impl_check_3 954 is provable (926: Provable), then process 900 continues to steps 932-936; and if bounded/constrained impl_check_3 954 is not provable (926: Unprovable), then process 900 continues to steps 938-942 and loops back to 922 where one of one or more bounds, constraints, and/or restrictions is applied, e.g., 952, 956 or combinations of 952, 954 and/or 956.

In further example, at 956, impl_check_3 can be bounded to X timesteps or cycles, e.g., 100 timesteps or cycles, to hit property P in BUG Design, can be constrained to searching for property P in FIX Design for an offset or window Y timesteps/cycles past when property P hit in BUG Design, and can be restrained to searching for property P in FIX Design by applying a default driving D after property P hits in BUG Design. At 926 the result of bounded/constrained/restrained impl_check_3 956 is checked, and if bounded/constrained/restrained impl_check_3 956 is hit (926: Hit), then process 900 continues to step 928; if bounded/constrained/restrained impl_check_3 956 is provable (926: Provable), then process 900 continues to steps 932-936; and if bounded/constrained/restrained impl_check_3 956 is not provable (926: Unprovable), then process 900 continues to steps 938-942 and loops back to 922 where one of one or more bounds, constraints, and/or restrictions can be applied. It should be appreciated that while impl_check_3 only illustrates four different tests, including tests that bounded the number of timesteps or cycles to test BUG Design for property P, that constrained the checking to an offset or window Y after the property P hits in Bug Design, and/or that restrained the number of driving inputs, impl_check_3 can include applying bounds, constraints, and restraints separate and independently, and/or applying different bounds, constraints, and/or restrictions individually and in combinations.

While the illustrative methods, techniques, and/or systems described above can be implemented in hardware, such as in units and circuitry, various aspects of the illustrative embodiments may be implemented in software as well. For example, it will be understood that one or more blocks of the flowchart illustrations in FIGS. 9-10, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

A method and/or system for pre-silicon verification of an integrated circuit design modified to avoid a hit of property P, where property P has a known counterexample, is disclosed. The method and/or system in one or more embodiments includes providing a first integrated circuit having one or more bugs, wherein the first integrated circuit hits property P in response to the one or more bugs; providing a second integrated circuit that has been modified in a manner intended to avoid property P; providing one or more inputs to both first integrated circuit and second integrated circuit; and applying a first implication check in an equivalence testbench on the first integrated circuit and on the second integrated circuit to determine whether the second integrated circuit hits property P in the same way as the first integrated circuit hits property P, where the same one or more inputs are provided to the first integrated circuit and the second integrated circuit. In one or more embodiments, determining whether the second integrated circuit hits property P in the same way includes with the same driving, along the same path, and/or at the same timestep or cycle, and preferably according to the same driving, same path, and at the same timestep (cycle). Additionally or alternatively the method and/or system includes in an aspect applying a second implication check in an equivalence testbench on the first integrated circuit and on the second integrated circuit to determine whether the second integrated circuit hits property P during any cycle that the first integrated circuit does not hit property P, where the same one or more inputs are provided to the first integrated circuit and the second integrated circuit. In one or more embodiments applying second implication check includes determining whether the second integrated circuit hits property P at a different cycle than the first integrated circuit hits property P. The method and/or system in one or more aspects additionally or alternatively includes applying a third implication check in an equivalence testbench on the first integrated circuit and the second integrated circuit to determine whether the second integrated circuit hits property P further along a path than the first integrated circuit hits property P where the same inputs are applied to the first and second integrated circuits during application of the third implication check. The third implication check in one or more aspects is applied in response to the first implication check not hitting property P in the second integrated circuit, and in an optional further aspect in response to the first implication check being provable that the second integrated circuit will not hit property P.

In an embodiment, the method and/or system optionally further includes, in response to the third implication check not hitting property P in the second integrated circuit and it not being provable that the second integrated circuit will hit property P during application of the third implication test, the method and/or system further includes applying at least one of the group consisting of a bounded third implication check, a constrained third implication check, a restrained third implication check, and combinations thereof, in an equivalence testbench to determine whether the second integrated circuit hits property P further along a path than the first integrated circuit hits property P. In a further embodiment, the method and/or system optionally further includes, in response to the third implication check not hitting property P in the second integrated circuit and it being provable that the second integrated circuit will hit property P during application of the third implication test, the method includes applying at least one of the group consisting of a less bounded third implication check, a less constrained third implication check, a less restrained third implication check, and combinations thereof, in an equivalence testbench to determine whether the second integrated circuit hits property P further along a path than the first integrated circuit hits property P.

The bounded third implication check in an embodiment includes applying the third implication check on the first and second integrated circuits for a number X cycles to determine whether the first integrated circuit hits property P; and in response to first integrated circuit hitting property P within X cycles, continuing to apply the third implication check for a potentially infinite number of cycles thereafter to determine whether second integrated circuit hits property P; and in response to the first integrated circuit not hitting property P within X cycles, not continuing to apply the third implication check. The constrained third implication check in an aspect includes applying the third implication check on the first and second integrated circuits for a number Y cycles after the first integrated circuit hits property P to determine whether second integrated circuit hits property P. In a further embodiment, the restrained third implication check includes applying the third implication check on the first and second integrated circuits using a single driving D after the first integrated circuit hits property P to determine whether second integrated circuit hits property P. In one or more embodiments, the constrained third implication check includes applying the third implication check on the first and second integrated circuits for a number Y cycles after the first integrated circuit hits property P to determine whether second integrated circuit hits property P; and wherein the restrained third implication check includes applying the third implication check on the first and second integrated circuits using a single driving D after the first integrated circuit hits property P to determine whether second integrated circuit hits property P.

The method and/or system in an embodiment includes applying an output of the first integrated circuit as a first input to an AND gate and applying an output of the second integrated circuit as a second input to the AND gate, wherein the output of the AND gate determines whether property P hits in the second integrated circuit. The method in a further aspect optionally includes applying an output of the first integrated circuit as an input to a NOT gate and applying the output of the NOT gate as a first input to an AND gate, and applying an output of the second integrated circuit as a second input to the AND gate, wherein the output of the AND gate determines whether property P hits in the second integrated circuit.

In one or more embodiments, a system for pre-silicon verification of an integrated circuit design modified to avoid a hit of property P where property P has a known counter-example is disclosed. The system in one or more aspects includes one or more processors having circuitry and logic configured to: receive a first integrated circuit having one or more bugs, wherein the first integrated circuit hits property P in response to the one or more bugs; receive a second integrated circuit that has been modified in a manner intended to avoid property P; create a composite of first integrated circuit and the second integrated circuit; provide one or more inputs to both the first integrated circuit and the second integrated circuit; and apply a first implication check on the first integrated circuit and on the second integrated circuit to determine whether the second integrated circuit hits property P in the same way as the first integrated circuit hits property P, where the same one or more inputs are provided to the first and second integrated circuit. In an aspect the system alternatively or additionally is configured to apply a second implication check on the first integrated circuit and on the second integrated circuit to determine whether the second integrated circuit hits property P at a different cycle than the first integrated circuit hits property P where the same one or more inputs are provided to the first integrated circuit and the second integrated circuit. Alternatively or additionally, the one or more processors is further configured to: apply a third implication check on the first integrated circuit and the second integrated circuit to determine whether the second integrated circuit hits property P further along a path than the first integrated circuit hits property P where the same inputs are applied to the first and second integrated circuits during application of the third implication check.

A computer program product is also disclosed for pre-silicon verification of an integrated circuit design modified to avoid a hit of property P where property P has a known counterexample. The computer program product in one or more aspects includes: a computer readable storage medium readable by a processing circuit, the computer readable storage medium containing programming instructions for execution by the processing circuit for performing a method comprising executing a test code by: applying one or more inputs to a first integrated circuit having one or more bugs, wherein in response to the one or more inputs the first integrated circuit hits property P; applying the same one or more inputs to a second integrated circuit that has been modified in a manner intended to avoid property P; and applying a first implication check on the first integrated circuit and on the second integrated circuit to determine whether the second integrated circuit hits property P in the same way as the first integrated circuit hits property P, where the same one or more inputs are applied to both the first and second integrated circuit. Additionally or alternatively, the computer readable storage medium can include programming instructions that when executed by the processor apply a second implication check on the first integrated circuit and on the second integrated circuit to determine whether the second integrated circuit hits property P at a different cycle than the first integrated circuit hits property P, where the same one or more inputs are provided to both the first and second integrated circuit. Additionally or alternatively, the computer readable storage medium can include programming instructions that when executed by the processor apply a third implication check on the first integrated circuit and the second integrated circuit to determine whether the second integrated circuit hits property P further along a path than the first integrated circuit hits property P and in response to the third implication check not hitting property P in the second integrated circuit and it not being provable that the second integrated circuit will hit property P during application of the third implication test, applying at least one of the group consisting of a bounded third implication check, a constrained third implication check, a restrained third implication check, and combinations thereof, to determine whether the second integrated circuit hits property P further along a path than the first integrated circuit hits property P.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for pre-silicon verification of an integrated circuit design modified to avoid a hit of property P where property P has a known counterexample, the method comprising:

providing a first integrated circuit having one or more bugs, wherein the first integrated circuit hits property P in response to the one or more bugs;

providing a second integrated circuit that has been modified in a manner intended to avoid property P;

providing one or more inputs to both first integrated circuit and second integrated circuit;

in response to providing the same one or more inputs to the first integrated circuit and the second integrated circuit, applying a first implication check in an equivalence testbench on the first integrated circuit and on the second integrated circuit to determine whether the second integrated circuit hits property P in the same way as the first integrated circuit hits property P; and in response to providing the same one or more inputs to the first integrated circuit and the second integrated circuit, applying a second implication check in an equivalence testbench on the first integrated circuit and on the second integrated circuit to determine whether the second integrated circuit hits property P at a different timestep than the first integrated circuit hits property P.

2. The method of claim 1, wherein the first implication check comprises applying an output of the first integrated circuit as a first input to an AND gate and applying an output of the second integrated circuit as a second input to the AND gate, wherein the output of the AND gate determines whether property P hits in the second integrated circuit.

3. The method of claim 1, wherein the second implication check comprises applying an output of the first integrated circuit as an input to a NOT gate and applying the output of the NOT gate as a first input to an AND gate, and applying an output of the second integrated circuit as a second input to the AND gate, wherein the output of the AND gate determines whether property P hits in the second integrated circuit.

4. The method of claim 1, further comprising applying a third implication check in an equivalence testbench on the first integrated circuit and the second integrated circuit to determine whether the second integrated circuit hits property P further along a path than the first integrated circuit hits property P where the same inputs are applied to the first and second integrated circuits during application of the third implication check.

5. The method of claim 4, further comprising applying the third implication check in response to the first implication check not hitting property P in the second integrated circuit.

6. The method of claim 4, further comprising applying the third implication check in response to the first implication check not hitting property P in the second integrated circuit and further in response to the first implication check being provable that the second integrated circuit will not hit property P.

7. The method of claim 1, further comprising:
applying a third implication check in an equivalence testbench on the first integrated circuit and the second integrated circuit to determine whether the second integrated circuit hits property P further along a path than the first integrated circuit hits property P; and
in response to the third implication check not hitting property P in the second integrated circuit and it not being provable that the second integrated circuit will hit property P during application of the third implication check, applying at least one of the group consisting of a bounded third implication check, a constrained third implication check, a restrained third implication check, and combinations thereof, in an equivalence testbench to determine whether the second integrated circuit hits property P further along a path than the first integrated circuit hits property P.

8. The method of claim 7, wherein the bounded third implication check comprises applying the third implication check on the first and second integrated circuits for a number X timesteps to determine whether the first integrated circuit hits property P; and
in response to first integrated circuit hitting property P within X timesteps, continuing to apply the third implication check for a potentially infinite number of timesteps thereafter to determine whether second integrated circuit hits property P; and
in response to the first integrated circuit not hitting property P within X timesteps, not continuing to apply the third implication check.

9. The method of claim 8, wherein the constrained third implication check comprises applying the third implication check on the first and second integrated circuits for a number Y timesteps after the first integrated circuit hits property P to determine whether second integrated circuit hits property P; and wherein the restrained third implication check comprises applying the third implication check on the first and second integrated circuits using a single driving D after the first integrated circuit hits property P to determine whether second integrated circuit hits property P.

10. The method of claim 7, wherein the constrained third implication check comprises applying the third implication check on the first and second integrated circuits for a number Y timesteps after the first integrated circuit hits property P to determine whether second integrated circuit hits property P.

11. The method of claim 7, wherein the restrained third implication check comprises applying the third implication check on the first and second integrated circuits using a single driving D after the first integrated circuit hits property P to determine whether second integrated circuit hits property P.

12. The method of claim 1, further comprising:
applying a bounded, constrained, or restrained third implication check in an equivalence testbench on the first integrated circuit and the second integrated circuit to determine whether the second integrated circuit hits property P further along a path than the first integrated circuit hits property P; and
in response to the bounded, constrained, or restrained third implication check not hitting property P in the second integrated circuit and it being provable that the second integrated circuit will hit property P during application of the bounded, constrained, or restrained third implication check, applying at least one of the group consisting of a less bounded third implication check, a less constrained third implication check, a less restrained third implication check, and combinations thereof, in an equivalence testbench to determine whether the second integrated circuit hits property P further along a path than the first integrated circuit hits property P.

13. A system for pre-silicon verification of an integrated circuit design modified to avoid a hit of property P where property P has a known counterexample, the system comprising one or more processors having circuitry and logic configured to:
receive a first integrated circuit having one or more bugs, wherein the first integrated circuit hits property P in response to the one or more bugs;
receive a second integrated circuit that has been modified in a manner intended to avoid property P;
create a composite of first integrated circuit and the second integrated circuit;
provide one or more inputs to both the first integrated circuit and the second integrated circuit;
in response to providing the same one or more inputs to the first integrated circuit and the second integrated circuit, apply a first implication check on the first integrated circuit and on the second integrated circuit to determine whether the second integrated circuit hits property P in the same way as the first integrated circuit hits property P; and
in response to providing the same one or more inputs to the first integrated circuit and the second integrated circuit, apply a second implication check on the first integrated circuit and on the second integrated circuit to determine whether the second integrated circuit hits property P during any timestep that the first integrated circuit does not hit property P.

14. The system of claim 13, wherein the one or more processors is further configured to:
   apply a third implication check on the first integrated circuit and the second integrated circuit to determine whether the second integrated circuit hits property P further along a path than the first integrated circuit hits property P where the same inputs are applied to the first and second integrated circuits during application of the third implication check.

15. The system of claim 14, further comprising applying the third implication check in response to the first implication check not hitting property P in the second integrated circuit and further in response to the first implication check being provable that the second integrated circuit will not hit property P.

16. The system of claim 13, further comprising:
   applying a third implication check on the first integrated circuit and the second integrated circuit to determine whether the second integrated circuit hits property P further along a path than the first integrated circuit hits property P; and
   in response to the third implication check not hitting property P in the second integrated circuit and it not being provable that the second integrated circuit will hit property P during application of the third implication check, applying at least one of the group consisting of a bounded third implication check, a constrained third implication check, a restrained third implication check, and combinations thereof, in an equivalence testbench to determine whether the second integrated circuit hits property P further along a path than the first integrated circuit hits property P.

17. The system of claim 16, wherein the bounded third implication check comprises applying the third implication check on the first and second integrated circuits for a number X timesteps to determine whether the first integrated circuit hits property P; and
   in response to first integrated circuit hitting property P within X timesteps, continuing to apply the third implication check for a potentially infinite number of timesteps thereafter to determine whether second integrated circuit hits property P; and
   in response to the first integrated circuit not hitting property P within X timesteps, not continuing to apply the third implication check.

18. The method of claim 17, wherein the constrained third implication check comprises applying the third implication check on the first and second integrated circuits for a number Y timesteps after the first integrated circuit hits property P to determine whether second integrated circuit hits property P; and wherein the restrained third implication check comprises applying the third implication check on the first and second integrated circuits using a driving D after the first integrated circuit hits property P to determine whether second integrated circuit hits property P.

19. A computer program product for pre-silicon verification of an integrated circuit design modified to avoid a hit of property P where property P has a known counterexample, the computer program product comprising:
   a computer readable storage medium readable by a processing circuit, the computer readable storage medium containing programming instructions for execution by the processing circuit for performing a method comprising executing a test code by:
      applying one or more inputs to a first integrated circuit having one or more bugs, wherein in response to the one or more inputs the first integrated circuit hits property P;
      applying the same one or more inputs to a second integrated circuit that has been modified in a manner intended to avoid property P;
      in response to applying the same one or more inputs to the first integrated circuit and the second integrated circuit, applying a first implication check on the first integrated circuit and on the second integrated circuit to determine whether the second integrated circuit hits property P in the same way as the first integrated circuit hits property P;
      in response to applying the same one or more inputs to the first integrated circuit and the second integrated circuit, applying a second implication check on the first integrated circuit and on the second integrated circuit to determine whether the second integrated circuit hits property P during any timestep that the first integrated circuit does not hit property P;
      in response to applying the same one or more inputs to the first integrated circuit and the second integrated circuit, applying a third implication check on the first integrated circuit and the second integrated circuit to determine whether the second integrated circuit hits property P further along a path than the first integrated circuit hits property P wherein the third implication check is applied in response to the first implication check not hitting property P in the second integrated circuit and further in response to the first implication check being provable that the second integrated circuit will not hit property P; and
      in response to the third implication check not hitting property P in the second integrated circuit and it not being provable that the second integrated circuit will hit property P during application of the third implication check, applying at least one of the group consisting of a bounded third implication check, a constrained third implication check, a restrained third implication check, and combinations thereof, to determine whether the second integrated circuit hits property P further along a path than the first integrated circuit hits property P.

20. The computer program product of claim 19, wherein the computer readable storage medium further contains programming instructions for execution by the processing circuit for:
   (a) performing the bounded third implication check where the bounded third implication check comprises applying the third implication check on the first and second integrated circuits for a number X timesteps to determine whether the first integrated circuit hits property P; and
      in response to first integrated circuit hitting property P within X timesteps, continuing to apply the third implication check for a potentially infinite number of timesteps thereafter to determine whether second integrated circuit hits property P; and
      in response to the first integrated circuit not hitting property P within X timesteps, not continuing to apply the third implication check;
   (b) performing the constrained third implication check where the constrained third implication check comprises applying the constrained third implication check on the first and second integrated circuits for a number Y timesteps after the first integrated circuit hits property P to determine whether second integrated circuit hits property P; and (c) performing the restrained third implication check where the constrained implication check comprises applying the restrained third implication check on the first and second integrated circuits using a driving D after the first integrated circuit hits property P to determine whether second integrated circuit hits property P.

* * * * *